Dec. 9, 1924. 1,519,095

H. P. KRAFT

QUICK ACTING PUMP COUPLING

Filed May 20, 1921

Inventor
Henry P. Kraft,
By his Attorneys,
Fraser and Myers

Patented Dec. 9, 1924.

1,519,095

UNITED STATES PATENT OFFICE.

HENRY PHILLIP KRAFT, OF RIDGEWOOD, NEW JERSEY; EDGAR J. PHILLIPS AND EARL A. DARR EXECUTORS OF HENRY P. KRAFT, DECEASED.

QUICK-ACTING PUMP COUPLING.

Application filed May 20, 1921. Serial No. 471,274.

*To all whom it may concern:*

Be it known that I, HENRY PHILLIP KRAFT, a citizen of the United States of America, residing in Ridgewood, in the county of Bergen and State of New Jersey, have invented certain new and useful Improvements in a Quick-Acting Pump Coupling, of which the following is a specification.

The present invention relates to pump couplings, and aims to provide certain improvements therein.

The present invention is particularly directed to that type of pump coupling, whereby a quick attachment and detachment of said coupling with a tire valve or the like, may be readily made, and one wherein notwithstanding its comparatively simple construction provides a very secure union between the coupled parts.

According to the present invention I provide a coupling member having an enlarged end adapted to fit over a valve nipple or other threaded member. A section of this end is preferably cut away to admit a dog or catch member adapted to be projected into the bore of the coupling. This dog or catch member is preferably formed with screw threads adapted to engage the threads on the member to which it is to be coupled. According to one embodiment of the invention the dog is carried by a split ring and manipulated by a finger piece associated with said split ring through a camming action. But according to the preferred embodiments of the invention as herein disclosed the dog or catch member is carried directly by the body of the coupling and is operated by a manipulating part provided with a cam face, carried by a pair of ears or lugs on the body of the coupling. In the various embodiments of the invention, the same broad inventive idea is disclosed, which briefly stated is, that of causing an engagement between a threaded dog or catch member carried by a coupling with a valve nipple or the like through the simple tilting or moving of a finger-piece which carries a camming face.

The invention also includes other features of improvement, which will be hereinafter more fully set forth.

Referring to the drawings which show several embodiments of the invention:

Figure 6:
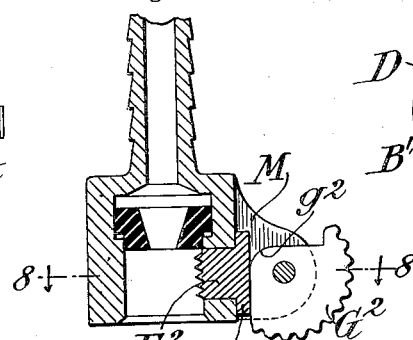
Figs. 6 and 7 are longitudinal sections showing the preferred embodiments of my invention.
Figure 5:
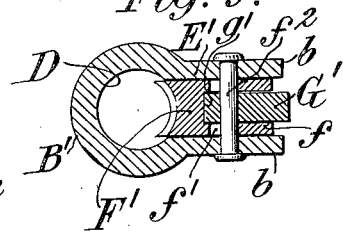
Fig. 5 is a section taken substantially on the line 5—5 of Fig. 3.
Figure 7:
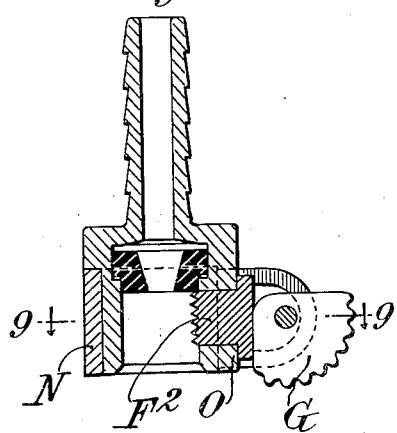
Figure 8:
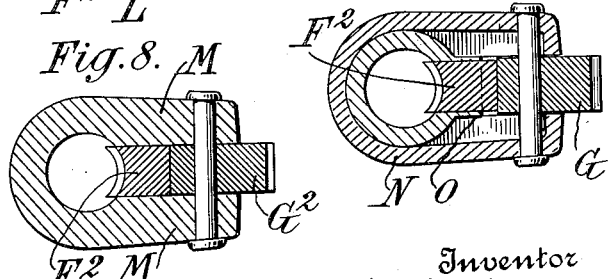
Figure 9:
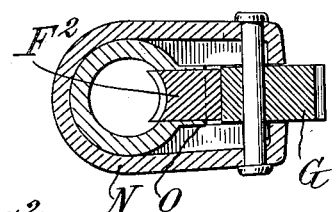

Figs. 8 and 9 are sections of Figs. 6 and 7 respectively taken on the lines 8—8 and 9—9.

Figure 1:
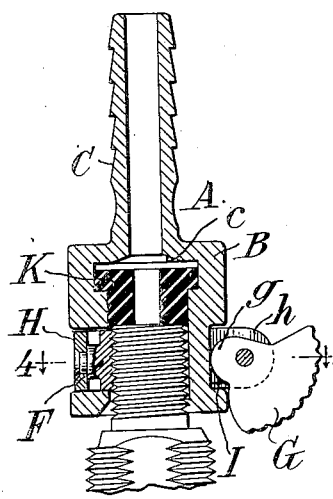
Figure 1 is a longitudinal section showing the coupling in engagement with a valve nipple.
Figure 2:
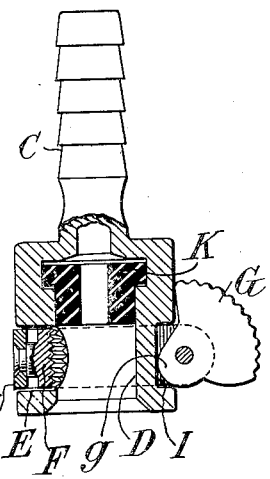
Fig. 2 is a longitudinal section partly in elevation of the coupling showing the dog in its disengaging or retracted position.
Figure 4:
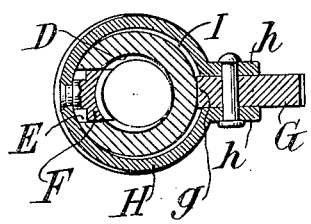
Fig. 4 is a section taken substantially on the line 4—4 of Fig. 1.

Referring first to Figs. 1, 2 and 4 of the drawings let A indicate the coupling which consists of a body portion B and the usual ridged shank C for engagement with a rubber hose. The body portion B is preferably enlarged and formed with a bore D which is adapted to pass over the end of a valve nipple, the wall of the bore D being preferably unthreaded so as to slip easily over said valve nipple. The body portion B is preferably recessed as shown at E, to receive a dog or catch member F, said dog being provided with screw threads at its inner end and adapted to be moved into the bore D to engage the valve nipple and to be retracted therefrom to disengage said nipple. The dog in cross section is of the same configuration as the recess F, which acts to guide said dog in its inward and outward movement and thus maintain the threaded end thereof in its proper alignment with respect to the valve nipple. For supporting and providing an operative connection between the dog F and a manipulating finger piece G, there is provided a split ring member H, positioned in an annular groove I formed on the body of the coupling member B. This ring H is preferably loosely mounted in said groove I to lie substantially flush with the outer surface of the body portion and has its ends formed with offset ears *h*, between which is mounted the finger piece G. At a point substantially diametrically opposite the finger piece, the dog F is connected to the ring H in any approved manner and herein shown as riveted thereto. The finger piece G is mounted on a pivot pin passing through the ears *h*, and is designed to be tilted or rotated in a longitudinal direction with respect to the coupling. The finger piece G is formed with a cam face $g$ adapted to coact with the wall of the groove I adjacent thereto to shift the ring H bodily with respect to said groove and with a finger manipulating part herein shown as a quadrant of a circle having its edge milled. It is to be understood, however, that the finger piece may take any desired form. The bodily shifting of the ring, results in the movement of the dog into and out of the bore D.

In order to provide a leak-tight seal between the coupling and the valve nipple the bore D in the body B is preferably provided with a flexible gasket K, adapted to make contact with the end of the valve nipple when the coupling is applied thereto. As shown this gasket is in the nature of a plunger adapted to move longitudinally in the bore D. To ensure the formation of a leak-tight joint between the coupled members, the longitudinal movement of the gasket is promoted by forming the inner end of the bore in the shank C with a flaring open end $c$, so as to expose a large surface area of the gasket K to the incoming inflating pressure. The result of this construction is that the incoming pressure will act upon the top of the plunger gasket to move it into contact with the end of the valve nipple to form a seal therewith.

Figure 3:
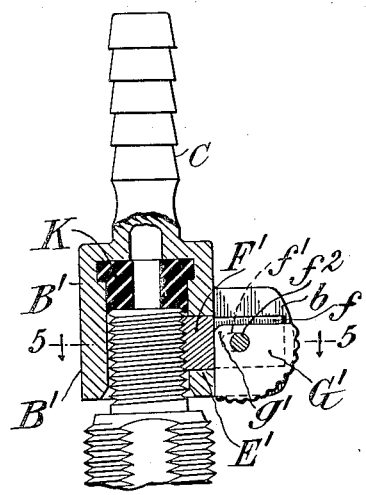
Fig. 3 is a view similar to Fig. 1 showing another form of the invention.

In the embodiment of the invention shown in Fig. 3, I do away with the split supporting ring H, and mount the dog and manipulating finger piece directly on the body member B'. This, I accomplish by forming the body B' with a pair of integral ears $b$, one on each side of recess E' which carries the dog F'. The dog as herein disclosed is formed with a bifurcated shank $f$, the prongs of which are formed with coinciding elongated openings $f'$, through which passes a guide pin $f^2$. This guide pin also passes through the ears $b$ and through the finger piece G' for which it acts as a pivot. As in Figs. 1 and 2, the finger piece G positioned between the bifurcation on the dog and the ears on the body member is formed with a cam face $g'$ which acts to move the dog into and out of the bore D. In the present construction this cam face acts directly against the head or bite of the bifurcation on the dog member.

In the preferred embodiments of my invention as disclosed in Figs. 6 and 7 the construction is similar in many respects to that shown in Fig. 3, and hereinbefore described, the outstanding features being that the dog is not fixedly connected to the manipulating finger piece and that an improved form of packing gasket is employed. As herein shown the dog $F^2$ is formed with an enlarged substantially flat head L which overlies the recess in which the dog is movable and limits the inward projection of the dog into the bore of the coupling. Said head L also serves as the contact surface for the cam face $g^2$ on the manipulating finger piece $G^2$, which when tilted downwardly urges the dog inwardly through the action of said cam face. The finger piece $G^2$ is pivotally mounted between a pair of ears M formed either integrally with or carried by the body portion and as in the previously described modifications is preferably formed as a quadrant of a circle with its outer edge milled or roughened in any appropriate manner. In Fig. 6 wherein the ears M are shown as formed integral with the body portion, the body portion may be made by either a series of drawing operations from metal of appropriate cross sectional configuration or by casting from a suitable pattern. In Fig. 7, the ears or lugs M are formed on a separate sleeve member N which is fitted over a part of the body portion of the coupling to lie flush with the upper portion thereof and is secured thereto in any approved manner. This sleeve member N may be in the form of a casting or may be made by stamping from suitable sheet metal. As shown in Figs. 7 and 9, the lower part of the body portion is formed with a rib or projection O, which serves to guide and position the sleeve N on the body portion prior to its permanent fastening thereto, but it is evident that this rib may be done away with without departing from the inventive thought disclosed.

The improved packing gasket K' disclosed in Figs. 6 and 7 is similar in many respects to that shown in Figs. 1 and 2, in that it consists of a flexible gasket in the nature of a plunger adapted to move longitudinally of the bore. To promote this longitudinal movement, the inner end of the coupling shank is flared outwardly as shown at $c$ and the gasket K' formed with a tapered bore $k'$, the flared end of said bore facing the flared opening in the shank. It will thus be seen that fluid pressure entering the shank will have a greater longitudinal component acting directly against the plunger gasket than heretofore provided, due to the increased gasket surface exposed to such pressure. A more certain and perfect leak-tight seal between the coupled members will therefore result from said construction.

In operation, to apply the device the finger piece is positioned so that the dog lies either in its retracted position flush with the bore D as shown in Fig. 2 or so that it may be readily moved into said position upon contacting with the valve nipple. In this position the coupling is slipped over the valve nipple and the finger piece is tilted or rotated downwardly to bring the threaded dog into engagement with the nipple as shown in Figs. 1 and 3. A very secure connection is thus provided. When it is desired to remove the coupling a tilting or rotation of the finger piece upwardly and the lifting off of the coupling is all that is necessary.

Although I have shown several embodiments of the present invention as applied to pump couplings, it is obvious that the inventive thought involved may be applied to other devices such as dust caps, rim-nuts or other devices which it is sought to couple with other parts, and I, therefore, do not wish to be limited to the particular constructions illustrated, as various modifications may be resorted to without departing from the spirit of the invention. For example, instead of having the bore of the coupling unthreaded and the engaging face of the dog threaded, this arrangement may be reversed or both the bore of the coupling and the engaging face of the dog may be threaded as desired.

What I claim is:—

1. A pump coupling or the like, having a movable dog adapted to engage a threaded member to hold the coupling thereon, and a rotative member formed with a cam face adapted to engage and move said dog into engagement with the threaded member, said rotative member being movable about an axis arranged at right angles to the longitudinal axis of the pump coupling.

2. A pump coupling or the like having a recessed body portion, a pair of ears on said body portion adjacent said recess, a dog movable in said recess and between said ears and adapted to engage a part to hold the coupling thereon and a manipulating member pivoted to said ears and adapted to move said dog into engagement with said part.

In witness whereof, I have hereunto signed my name.

HENRY PHILLIP KRAFT.